INVENTORS
WOUTER SMEULERS
JOHANNES S. A. VAN HATTUM

BY
AGENT

United States Patent Office
3,426,243
Patented Feb. 4, 1969

3,426,243
CIRCUIT ARRANGEMENT FOR PRODUCING A SAWTOOTH CURRENT ACROSS THE VERTICAL DEFLECTION COIL OF A TELEVISION RECEIVER
Wouter Smeulers and Johannes Simon Albert van Hattum, Emmasingel, Eindhoven, Netherlands, assignors to North American Philips Company, Inc., New York, N.Y., a corporation of Delaware
Filed Mar. 24, 1966, Ser. No. 537,096
Claims priority, application Netherlands, Apr. 3, 1965, 6504264
U.S. Cl. 315—27   6 Claims
Int. Cl. H01j 29/70

ABSTRACT OF THE DISCLOSURE

A circuit for introducing adjustable parabolic and S-components in a sawtooth current in a coil, wherein the coil is connected in the output of an amplifier device, consists of the series circuit of a charging capacitor, a winding coupled to the coil, and a first resistor. A first series circuit of a second resistor and a reservoir capacitor is connected between the junction of the first resistor and winding and the junction of the winding and charging capacitor, in that order. The junction of the second resistor and second capacitor are connected to the control electrode of the amplifier. The other end of the charging capacitor is connected to a variable tapping on a parallel resistance capacitance circuit in another input circuit of the device, in order to permit varying of the relative amplitudes of the parabolic and S-components. A variable resistor is connected between the control electrode and the variable tapping in order to permit variation of the amplitudes of the parabolic and S-component with respect to the sawtooth component.

---

The invention relates to a circuit arrangement for producing a sawtooth current across the vertical deflection coil of a television receiver. The coil is included in the output circuit of the vertical output stage, to the control-electrode of which is applied the sawtooth control-signal which is developed across a charging capacitor included in the control-electrode circuit. The charging-capacitor is periodically discharged and is recharged with the aid of a charging circuit which includes the series combination of a resistor and a winding, lying outside the discharging circuit. The winding is magnetically coupled with a choke included in the output circuit of the vertical output stage, through which winding a voltage is induced, which is opposite the capacitor voltage. Said winding has connected with it in parallel the series combination of at least one resistor and one reservoir capacitor, the free end of the latter being connected to the junction of the charging capacitor and the winding. A furher input electrode of the output stage has connected to it the parallel combination of a resistor and a capacitor. One end of a further resistor is connected to the control electrode of the vertical output stage, and the other end of the further resistor is coupled with the resistor connected to the said input electrode.

Such a circuit arrangement is described in U.S. Patent No. 2,851,632. It is, however, necessary to add to each cycle of the sawtooth current one cycle of a parabola component and also one cycle of a so-called S-component.

The parabola component is required in view of the fact that the vertical deflection coil is coupled through a transformer with the vertical output stage. The same applies to the case in which for other reasons than coupling through the transformer not only the vertical deflection coil, behaving substantially like a resistor, but also an inductor is included in the output circuit of the vertical final stage.

The S-component is required in view of the fact that the display screen of the display tube in a television receiver is flat. Therefore, the rate of deflection of the electron beam must be higher at the centre of the screen than at the edge in order to achieve a linear displacement of the spot on the display screen. The S indicates symbolically what form the current through the deflection coil must be for obtaining these desired deflection rates.

Numerous circuit arrangements are known by which the desired current form can be produced. However, they have the disadvantage that they are either too complicated or are not capable of providing the correct ratio between the sawtooth, parabola and S-component. The circuit arrangement according to the invention is, on the contrary, simple and provides, in addition, the possibility of adjusting accurately the desired ratio between sawtooth, parabola and S-component, while it prevents, in addition, an excessive influence of undesirable higher degree components in the produced current.

In order to produce the parabola and S-component, and permit adjustment of their amplitudes, the circuit arrangement according to the invention is characterized in that in parallel with the reservoir capacitor there is connected an integrating network which consists of the series combination of an integrating capacitor and an integrating resistor, the free end of the latter being coupled with the junction of the charging capacitor and of the reservoir capacitor. The junction of the integrating resistor and the integrating capacitor is connected to the control-electrode of the output stage. The end of the charging capacitor remote from the winding is connected to a variable tapping of the resistor connected to the input electrode. The impedance of the latter resistor is, in operation, great with respect to the impedance of the comparatively great parallel-connected capacitor. In addition, the further resistor is made variable, and the end thereof not connected to the control electrode is connected to the tapping of the resistor connected to the input electrode. Variation of the tapping point adjusts the relative ampltiudes of the parabola and S-component, while variation of the further resistor controls the relative amplitudes of the parabola and S-component with respect to the sawtooth.

A few possible embodiments of circuit arrangements according to the invention will be described with reference to the accompanying figures, of which FIG. 1 shows a possible circuit diagram of an embodiment equipped with valves.

Figure 1:
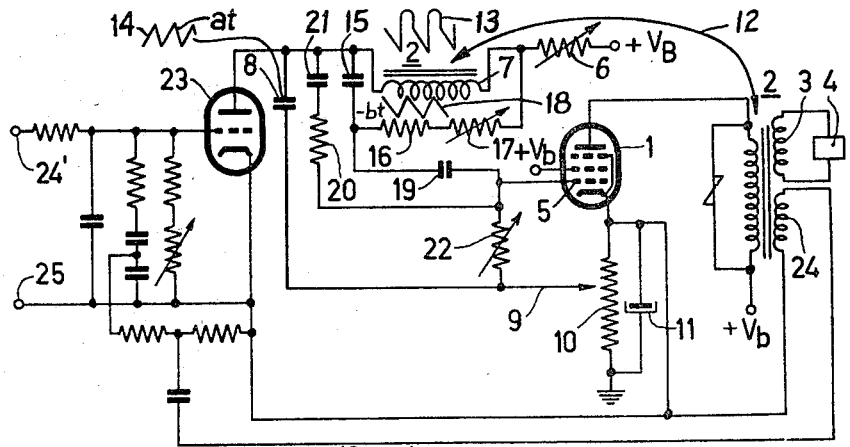

Referring to FIG. 1, the valve 1 is the vertical output stage of a television receiver, the anode circuit of which includes an output transformer 2. The vertical deflection coil 4 is connected to the secondary winding 3 of said transformer 2.

In order to produce the desired control-voltage for the control-electrode 5 of the valve 1, the grid circuit of said valve includes the following network. This network consists in the first place of a charging resistor 6, a winding 7 and a charging capacitor 8, which are connected in series with each other and the free end of the charging resistor 6 is connected to the positive supply voltage $+V_B$. In practice the voltage $+V_B$ is usually derived from the horizontal output stage, since this stage is, in the first place stabilised and is, in addition capable of providing a fairly high supply voltage, which is conducive to the linearity of the sawtooth voltage to be produced. It will be seen from FIG. 1 that the end of the capacitor 8 remote from the winding 7 is connected, in accordance with a first principle of the invention, to a variable tapping 9 associated with a potentiometer 10, which is included in the cathode conductor of the valve 1. This resistor is shunted by a comparatively large electrolytic capacitor 11, which is chosen so that its impedance is small for the repetition frequency of the sawtooth voltage to be produced with respect to the impedance of the resistor 10. As is indicated by the line 12 with the double arrow, the winding 7 is magnetically coupled with the primary winding of the transformer 2. As is the case in said Patent No. 2,851,632 the sense of winding of the winding 7 is such that the sawtooth voltage 13 produced across the winding 7 is unlike the sawtooth voltage 14 produced across the capacitor 8. Also in this case this serves to ensure an optimum linearity of the sawtooth 14. The winding 7 has furthermore connected with it in parallel the series combination of a capacitor 15 and two resistors 16 and 17, the resistor 17 being variable. The network 15, 16 and 17 is provided for eliminating the peak developed across the winding 7 during the vertical fly-back from the signal 13, so that a signal 18 is finally produced across the capacitor 15, the polarity of this signal being opposite that of the voltage 14 across the capacitor 8, its waveform being, however, substantially identical to that of the latter. For this purpose the capacitor 15 must have a comparatively high value: a value of 68K pf. may be chosen and the resistors 16 and 17 serving as peak resistors must be comparatively small; values of 22K ohms and 10K ohms respectively may be chosen.

According to a further aspect of the arrangement according to the invention the sawtooth voltage 18 is employed for producing partly the required parabola component and partly the desired S-component. As will be explained more fully hereinafter, this means that further steps are required to ensure that the control-signal applied finally to the control-electrode 5 accurately contains the desired components with their correct amplitudes.

In order to convert the sawtooth voltage 18 produced across the capacitor 15 into a signal containing the desired parabola and S-components, the capacitor 15 has connected with it in parallel the series combination of a capacitor 19, a resistor 20 and a large capacitor 21, operating as a blocking capacitor. The capacitor 21 is unessential for the further explanation; it only serves to ensure that the high direct voltage at the junction of the winding 7 and of the charging capacitor 8 cannot penetrate to the control-grid 5. Therefore, the network formed by the capacitor 19 and the resistor 20 constitutes the integration network proper which has to ensure that the voltage $V_{15}$ produced across the capacitor 15 is converted into a signal containing the desired correction components.

Finally, the third step according to the invention consists in that a resistor 22 is arranged between the control-grid 5 and the variable tapping 9.

Figure 2:
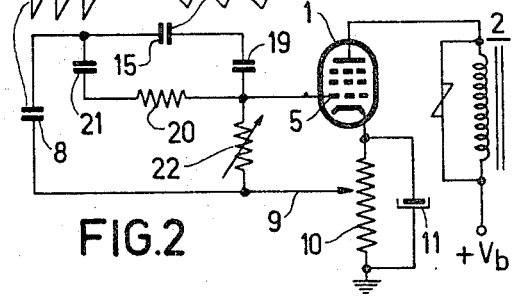
FIG. 2 shows a partial substitute diagram of the arrangement of FIG. 1.

In order to display that, in fact, the control-grid 5 has produced across it the desired control-signal and that by connecting the capacitor 8 and the resistor 22 to the variable tapping 9 the anode current starts passing through the valve 1, which contains all the desired components for providing accurately the correct waveform of the final current through the deflection coil 4, FIG. 2 shows partially a substitute diagram of the arrangement of FIG. 1. It will be apparent from FIG. 2 that the voltage $V_8$ of capacitor 8 is indicated by at and the voltage $V_{15}$ of capacitor 15 by $-bt$ $a$ and $b$ are constants, which have each the dimension of a voltage per unit time. It will furthermore be obvious that, since finally the sawtooth voltage to be applied to the control-grid 5 must increase during the forward stroke, the number of turns of the winding 7 has to be chosen so that the amplitude of the signal 13, as far as the sawtooth portion is concerned, is smaller than the amplitude of the signal 14 and it follows therefrom that for the signal 18 with respect to the signal 14 the same must apply. It therefore always applied $a > b$.

Figure 3:
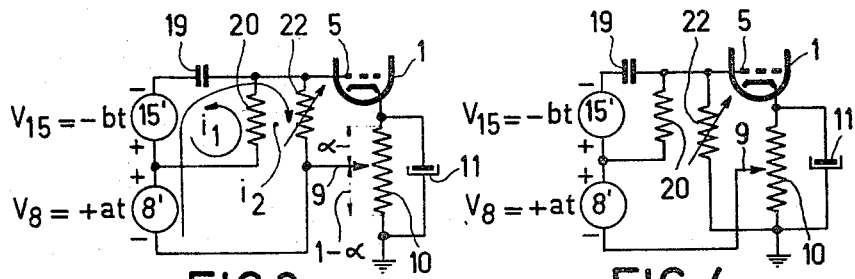
FIG. 3 shows a further diagrammatical substitute diagram of the arrangement of FIG. 2.

For performing the desired calculation the circuit diagram of FIG. 2 is further simplified and shown in this form in FIG. 3. In FIG. 3 the capacitor 15 is represented by a voltage source 15', which supplies a voltage $V_{15'}$. The capacitor 8 is represented by a source 8', which supplies the voltage $V_8$. The capacitor 21 is omitted from the diagram of FIG. 3, since it is large and unessential for these explanations. It is furthermore assumed in the diagram of FIG. 3 that the source 15' produces a current $i_1$ through the network of the capacitor 19 and the resistor 20 only, whilst the sources 8' and 15' produce a current $i_2$, which passes through the capacitor 19 and resistor 22. On the basis of these assumptions the following calculation can be made:

To the circuit with the resistor 20 and the capacitor 19 it applies that:

$$bt = i_1 R_{20} + \int \frac{i_1}{C_{19}} dt - \int \frac{i_2}{C_{19}} dt$$

wherein $R_{20}$ is the value of resistor 20 and $C_{19}$ the value of capacitor 19.

To the circuit of the capacitor 19 and the resistor 22 it applies that:

$$(a-b)t = i_2 R_{22} + \int \frac{i_2}{C_{19}} dt - \int \frac{i_1}{C_{19}} dt$$

wherein $R_{22}$ is the resistance of the resistor 22. These two equations are converted by the Laplace transform into:

$$\frac{b}{p} = i_1 R_{20}(p + \beta_1) - i_2 R_{20} \cdot \beta_1 \quad (1)$$

and $$\frac{a-b}{p} = i_2 R_{22}(p + \beta_2) - i_1 R_{22} \beta_2 \quad (2)$$

wherein $\beta_1$ and $\beta_2$ are represented by:

$$\beta_1 = \frac{1}{R_{20}C_{19}} \text{ and } \beta_2 = \frac{1}{R_{22}C_{19}}$$

The Equations 1 and 2 are reformed and reduced to the $t$-region which results in:

$$i_2 = \frac{1}{R_{22}} \left[ \frac{a\beta_2 - b(\beta_1 + \beta_2)}{(\beta_1 + \beta_2)^2} \{1 - e^{-(\beta_1 + \beta_2)t}\} + \frac{a\beta_1}{\beta_1 + \beta_2} t \right] \quad (3)$$

The voltage $V_i$ prevailing at the control-grid 5 is given by $V_i = i_2 R_{22}$ and by means of the Equation 3 we find:

$$V_i = \frac{a\beta_2 - b(\beta_1 + \beta_2)}{(\beta_1 + \beta_2)^2} \{1 - e^{-(\beta_1 + \beta_2)t}\} + \frac{a\beta_1}{\beta_1 + \beta_2} \quad (4)$$

Developing $e^{-(\beta_1 + \beta_2)t}$ in a series, the Equation 4 may we written as follows:

$$V_i = \frac{(a-b)t + b(\beta_1 + \beta_2) - a\beta_2}{2}t^2 - \frac{\{b(\beta_1 + \beta_2) - a\beta_2\}(\beta_1 + \beta_2)}{6}t^3 + \frac{\{b(\beta_1 + \beta_2) - a\beta_2\}(\beta_1 + \beta_2)^2}{24}t^4 - \frac{\{b(\beta_1 + \beta_2) - a\beta_2\}(\beta_1 + \beta_2)^3}{120}t^5 \quad (5)$$

The greater the time constants $R_{20}C_{19}$ and $R_{22}C_{19}$ are chosen, the small become the values of $\beta_1$ and $\beta_2$. Since, moreover, the denominator increases with an increasing degree in $t$ (for $t^4$ the denominator is 24 and for $t^5$ it is already 120), the fourth and higher degree terms in Equation 5 can be neglected with respect to the first, second and third degree terms with a correct choice of the resistors $R_{20}$ and $R_{22}$ and of the capacitor 19. Thus the Equation 5 changes into $$V_i = (a-b)t + \frac{b(\beta_1+\beta_2)-a\beta_2}{2}t^2 - \frac{\{b(\beta_1+\beta_2)-a\beta_2\}(\beta_1+\beta_2)}{6}t^3 \quad (6)$$

This signal contains, in principle, all the desired correction terms, since it contains not only the linear term, i.e. the sawtooth component $(a-b)t$ but also the positive quadratic term, i.e. the required parabolic component and a negative third-degree term, i.e. the component required for the S-correction. This S- or third-degree component must, in fact, be negative, since with respect to the flat display screen of the display tube the rate of scanning must be reduced both at the beginning and at the end of the stroke. This means a third-degree term must be subtracted from the linear term.

Both the second- and the third-degree term comprises a coefficient $b(\beta_1+\beta_2)-a\beta_2$. Filling in the values of $\beta_1$ and $\beta_2$, we find after some reformation:

$$\frac{1}{R_{20}C_{19}}\left[b-(a-b)\frac{R_{20}}{R_{22}}\right] \quad (7)$$

Since $a>b$, it follows therefrom that the positiveness of this coefficient depends upon the ratio between $R_{20}$ and $R_{22}$. On the basis of a positive term, it becomes constantly smaller according as $R_{22}$ diminishes until it changes over from positive to negative, which means that by means of $R_{22}$ in a first instance the measure of parabolic correction and the measure of S-correction can be adjusted.

In principle, the desired extent of parabolic correction with respect to the sawtooth component could be adjusted, but this does not apply to the associated extent of S-correction, since the terms $\beta_1$ and $\beta_2$ occur in the parabolic component in the first power and in the S-component in the second power. Since the $\beta$-values are small, the S-component is smaller than the parabolic component. If the $\beta$ values are raised, the S-component may be increased with respect to the parabolic component until the desired ratio between the parabolic and S-components is attained, after which without changing this ratio the two components can be simultaneously decreased by varying $R_{22}$ relatively to $R_{20}$ to their desired values relative to the sawtooth component. By increasing the $\beta$-values, however, the negligence of the higher-power terms in Equation 6 is no longer permissible. The control-signal will therefore contain not only the desired sawtooth, parabolic and S-components but also an excess of undesirable 4th, 5th and even higher power terms.

This means that the increase in the values of $\beta$ is restricted so that the desired ratio between the parabolic and S-components cannot be adjusted in this manner.

According to the principle of the invention negative feedback is used apart from the introduction of the negative sawtooth source $V_{15}=-bt$ and the parallel connection therewith of the network $R_{20}\cdot C_{19}$.

The anode current $i_a$ of the valve 1 can be indicated by $i_a=S(V_1-\alpha V_K)$, wherein S is the mutual conductance of the valve 1, and $V_K$ is the cathode voltage thereof. Since the screen-grid current of the valve 1 has a constant value, the cathode voltage $V_K$ can be represented on account of the A.C. nature of the negative feedback, by:

$$V_K=i_aZ_K=SV_iZ_K-S\alpha V_KZ_K$$

or $$V_K=\frac{SV_iZ_K}{1+S\alpha Z_K}$$

wherein $Z_K$ is the impedance of the network 10, 11 and $\alpha$ is the part of the resistor 10 between the tapping 9 and the cathode of the valve 1.

The impedance of the resistor 10 is great with respect to the impedance of the large electrolytic capacitor 11. Therefore, with some approximation this impedance is given by:

$$Z_K=\frac{1}{j\omega C_{11}}=\left|\frac{1}{\omega C_{11}}\right|$$

wherein $C_{11}$ is the capacity value of the capacitor 11. The repetition frequency of the sawtooth voltage produced is 50 c./s., so that with some approximation there can be written $\omega=2\pi 50$. If $C_{11}=200\ \mu F$, $$Z_K=\left|\frac{1}{2\pi 50\cdot 200\cdot 10^{-6}}\right|=\frac{10^2}{2\pi}$$

If $S=10$ ma./v. it follows therefrom that:

$$S\alpha Z_K=10^{-2}\cdot\frac{10^2}{2\pi}\cdot\alpha=\frac{\alpha}{2\pi}=\frac{\alpha}{6.28}$$

Since $$\alpha<1,\ \text{is}\ \frac{\alpha}{6.28}\ll 1$$

so that $S\alpha Z_K$ is negligible with respect to 1. For the voltage $V_K$, there may consequently be written approximately: $V_K=SV_iZ_K$.

As displayed above, the impedance $Z_K$ is determined substantially only by the capacitor 11, so that the voltage $V_K$ is substantially the integral of the voltage $V_i$. For this voltage we thus find:

$$V_K=\frac{S}{C_{11}}\left[\frac{a-b}{2}t^2+\frac{b(\beta_1+\beta_2)-a\beta_2}{6}t^3-\frac{\{b(\beta_1+\beta_2)-a\beta_2\}(\beta_1+\beta_2)}{24}t^4\right] \quad (8)$$

The $\beta$-terms are comparatively small, so that also in Equation 8 the fourth degree in $t$ is negligible with respect to the second and third degree terms. Thus Equation 8 changes into:

$$V_K=\frac{S}{C_{11}}\left[\frac{a-b}{2}t^2+\frac{b(\beta_1+\beta_2)-a\beta_2}{6}t^3\right] \quad (9)$$

We thus find for the anode current $i_a$ of the valve 1:

$$i_a=S(V_i-\alpha V_K)=$$

$$S\left[(a-b)t+\left\{\frac{b(\beta_1+\beta_2)-a\beta_2}{2}-\frac{S\alpha}{C_{11}}\frac{(a-b)}{2}\right\}t^2-\frac{\{b(\beta_1+\beta_2)-a\beta_2\}}{6}\left(\beta_1+\beta_2+\frac{S\alpha}{C_{11}}\right)t^3\right] \quad (10)$$

From Equation 10 it follows that by the negative feedback the parabolic component has been reduced by a factor:

$$\frac{S\alpha}{C_{11}}\cdot\frac{(a-b)}{2}$$

whilst the S-component has been increased by a factor:

$$\frac{S\alpha}{C_{11}}\cdot\frac{\{b(\beta_1+\beta_2)-a\beta_2\}}{6}$$

In this way the dilemma involved in the absence of the negative feedback is solved.

The $\beta$-terms may be chosen comparatively small. The negligence of the fourth and higher degree terms in Equation 6 is therefore justified. In Equation 6 the parabolic component is then too high, with respect to the third-degree component and this is compensated for by the negative feedback.

Briefly stated, the circuit arrangement according to the invention provides the following three possibilities of control:

(1) The $\beta$-values may be chosen to be small, so that the undesirable fourth and higher-degree terms are no longer troublesome;

(2) By varying the ratio between the resistors $R_{20}$ and $R_{22}$, to which end for example $R_{22}$ may be variable, the values of the parabolic and the S-correction components may be increased or decreased in the same sense with respect to the sawtooth component.

(3) By adjusting the negative feedback the parabolic component can be reduced and the S-component can be increased to an extent as is required for obtaining the correct ratio between the two components.

These three control-possibilities permit of adjusting the required corrections in a fully correct manner. This requires practically no additional parts. In the known circuit arrangements of Patent No. 2,851,632 the part of the arrangement for the production of the sawtooth and correction voltages comprises four capacitors and five resistors. In the arrangement according to the invention five capacitors and six resistors are required. In principle, we are concerned with a different arrangement of a substantially equal number of parts, the values of which have to be chosen carefully or which have to be variable.

In the foregoing the fact is left out of consideration that the voltage $V_{15}$ obtained from the winding 7 contains not only a linear term $-bt$ but also second- and third-degree components, since the anode current $i_a$, which induces a voltage in the winding 7, contains second- and third-degree terms. However, if the value of $\beta_1$ is chosen correctly, it can be said that the influence of the third- and fourth-degree terms in voltage $V_{15}$ with respect to the linear term is negligible. An exact calculation can, of course, be made, in which all factors also the negative feedback through the winding 7 are considered.

The formulae then obtained are, however, so complicated that it is difficult to make conclusions therefrom. In the explanation given above, it is therefore preferred to use an approximate calculation, which has the advantage of providing a good insight in the operation of the circuit arrangement.

So far the function of the triode 23 has been left out of consideration, since it is not connected with the principle of the invention. This triode only serves for a periodical discharge of the capacitor 8. To this end the signal derived from the output transformer 2 is applied through a further secondary winding 24 and various capacitors and resistors to the control-grid of the valve 23. The signal derived from the winding 24 has the same waveform as the signal 13 and ensures that during the fly-back the triode 23 gets into the conducting state, so that the capacitor 8 is discharged. The terminals 24' and 25 receive frame synchronising pulses which provide a direct synchronisation of the valve 23. It appears therefrom that the oscillator circuit formed by the valves 1 and 23 is of the so-called multivibrator type, in which, however, the feedback of the anode of the valve 1 to the control grid of the valve 23 is performed through the output transformer 2.

It will be obvious, however, that any other control-method for valve 23 may be employed. The valve 23 may be formed by a blocking oscillator, so that this valve in itself is included in an independent oscillator circuit which provides a periodical discharge of the capacitor 8. The advantage of the arrangement of FIG. 1 is however, that a separate blocking transformer is economised, whilst only the winding 24 suffices for obtaining a self-oscillating circuit.

It is neither strictly necessary for the deflection coil 4 to be connected through the winding 3 of the transformer 2 to the anode of the valve 1. When the impedance of the deflection coil 4 allows so, it may be connected through a capacitor cutting off the direct current to the anode of the valve 1. In this case the primary winding of the transformer 2 can be considered to be a choke with which the secondary winding 7 is magnetically coupled. The winding 24 may, if desired, also be coupled with said choke, if a transformer arrangement of the multivibrator type is desired, or the winding 24 may be omitted, and the valve 23 may be formed by a blocking oscillator. Particularly, if transistors are used instead of valves, it is common practice to couple the vertical deflection coil 4 directly with the collector electrode of the output transistor. It will be obvious that with the use of transistors all parts of the arrangement of FIG. 1 remain the same and that the operation is quite identical. In the calculations it is indifferent whether valves or transistors are employed.

Figure 4:
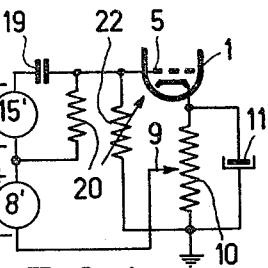
FIG. 4 shows a first possible modification of the substitute diagram of FIG. 3 and hence of the arrangement of FIG. 1

Possible modifications of the arrangement of FIG. 1 may be explained with reference to FIGS. 4 and 5. FIG. 4 shows the resistor 22 connected, instead of being connected between the control-grid 5 and the tapping 9, to the earth-connected end of the resistor 10. This mode of connection brings about scarcely any difference with respect to the A.C. effect from that of FIG. 3, but with respect to the D.C. adjustment of the valve 1 there is some difference. In the case of FIG. 3 the D.C. bias voltage of the control-grid 5 will follow the displacement of the tapping 9. In the arrangement of FIG. 4 this is not the case. It will be obvious that this modification also holds good without the need for further means for the arrangement of FIG. 1, since only the end of the resistor 22 remote from the control-grid 5 has to be connected to earth.

Figure 5:
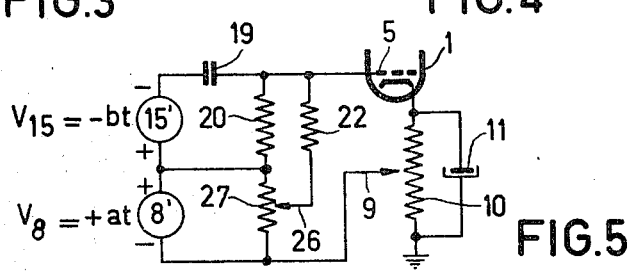
FIG. 5 shows a second possible modification of the substitute diagram of FIG. 3 and hence also of the arrangement of FIG. 1.

A further possible modification is shown in FIG. 5. In parallel with the source 8' there is connected a potentiometer resistor 27, provided with a variable tapping 26. The end of the resistor 22 remote from the control-grid 5 is connected to the tapping 26. This modification operates accurately like that of FIG. 3, which may be explained as follows. It is assumed that the variable tapping 26 is displaced towards the connection with the variable tapping 9. Then the same arrangement is obtained as that of FIG. 3 and therefore the operation is therefore quite identical. If, however, the tapping 26 is displaced towards the junction of the sources 8' and 15', the resistor 22 is in parallel with the resistor 20 and the operation of the arrangement of FIG. 5 will be accurately the same as that of FIG. 3, if resistor 22 had an infinite value. This means that in Equation 6 the factor $\beta_2=0$ and that both the quadratic and S-components will assume maximum values. It will be seen that the displacement of the tapping 26 from the junction of the sources 8' and 15' towards the tapping 9 brings about an attenuation of the parabolic and of the S-components. It can therefore be said that the displacement of the tapping 26 in the said direction has the same effect as a decrease of the resistor 22 in the arrangement of FIG. 3.

The modification of FIG. 5 may be realised in the arrangement of FIG. 1 by providing a potentiometer 27 with a tapping 26 in parallel with the capacitor 8 and by connecting the end of the resistor 22 remote from the control-grid 5 to the tapping 26. It should be noted that the resistance value of the potentiometer 27 should not be too high, since it should not effect too strongly the value of the factor $\beta_2$.

What is claimed is:
1. A circuit for producing a sawtooth waveform current in a coil, comprising:
    an amplifier device having an output electrode, and first and second input electrodes,
    output circuit means for coupling said output electrode to said coil,
    a charging capacitor,
    a discharging circuit connected to said charging capacitor for periodically discharging said charging capacitor,
    a charging circuit for charging said charging capacitor and comprising a first series circuit connected in series with said charging capacitor, said first series circuit comprising a serially connected winding and first resistor means,
    means coupling said winding to said output circuit to provide a voltage across said winding opposing the charging capacitor voltage,
    a second series circuit of a first capacitor and second resistor means,
    means connecting said second series circuit in parallel with said winding, with one end of said first capacitor being connected to one end of said charging capacitor, a third series circuit comprising a second capacitor and third resistor means connected in that order between the junction of said first capacitor and second resistor means and said one end of said charging capacitor, means connecting the junction of said second capacitor and third resistor means to said first input electrode, a parallel circuit comprising a third capacitor and fourth resistor means connected in parallel with said third capacitor, the impedance of said fourth resistor means being large with respect to the impedance of said third capacitor at the operating frequency, means connecting said parallel circuit between said second input electrode and a point of reference potential, and means connecting the other end of said charging capacitor to a tap on said fourth resistor means.

2. A circuit for producing a sawtooth waveform current in a coil, comprising:

an electron discharge device having an anode, a cathode, and a control grid, output circuit means for coupling said coil to said anode, a source of potential having first and second terminals, a charging capacitor, means connected to said charging capacitor for periodically discharging said charging capacitor, a charging circuit for said charging capacitor comprising a winding and first resistor means connected in that order between one end of said charging capacitor and said second terminal, means coupling said winding to said output circuit to provide a voltage across said winding opposing the charging capacitor voltage, a first series circuit of a storage capacitor and second resistor means connected in parallel with said winding with one end of said storage capacitor being connected to said one end of said charging capacitor, a second series circuit of an integrating capacitor and integrating resistor, means connecting said second series circuit in parallel with said storage capacitor, with one end of said integrating capacitor being connected to the other end of said storage capacitor, means connecting the other end of said integrating capacitor to said control grid, a parallel circuit of potentiometer means and a capacitor connected in parallel with said potentiometer means, the impedance of said potentiometer means being large with respect to the impedance of said parallel capacitor at the operating frequency, means connecting said parallel circuit between said cathode and first terminal, and means connecting the other end of said charging capacitor to a tap on said potentiometer means.

3. The circuit of claim 2, in which said output circuit comprises a transformer having a primary winding connected to said anode and a secondary winding coupled to said coil, wherein said first-mentioned winding is a tertiary winding of said transformer.

4. The circuit of claim 2, comprising variable resistor means connected between said control grid and said tap.

5. The circuit of claim 2, comprising variable resistor means connected between said control grid and said first terminal.

6. The circuit of claim 2, comprising a second potentiometer means connected in parallel with said charging capacitor, and resistor means connected between said control grid and the tap on said second potentiometer means.

No references cited.

RODNEY D. BENNETT, *Primary Examiner.*

J. G. BAXTER, *Assistant Examiner.*

U.S. Cl. X.R.

315—29